Feb. 7, 1950 C. A. GERTS ET AL 2,497,043
APPARATUS INCLUDING ROLLS WITH MANDREL GRIPPING AND
WORK CONTACTING PORTIONS FOR MAKING CURVED PROFILES
Filed March 9, 1944 8 Sheets-Sheet 1

INVENTORS.
Christian A. Gerts.
William H. Clay
BY John P. Tarbot
ATTORNEY

INVENTORS
Christian A. Gerts
William H. Clay
BY John P. Tarbot
ATTORNEY

FIG.13

Feb. 7, 1950     C. A. GERTS ET AL     2,497,043
APPARATUS INCLUDING ROLLS WITH MANDREL GRIPPING AND
WORK CONTACTING PORTIONS FOR MAKING CURVED PROFILES
Filed March 9, 1944     8 Sheets-Sheet 8

INVENTORS
Christian A. Gerts
William H. Clay
BY John P. Tarbot
ATTORNEY

Patented Feb. 7, 1950

2,497,043

UNITED STATES PATENT OFFICE 2,497,043

APPARATUS, INCLUDING ROLLS WITH MANDREL GRIPPING AND WORK CONTACTING PORTIONS FOR MAKING CURVED PROFILES

Christian A. Gerts, Philadelphia, and William H. Clay, Rydal, Pa., assignors to The Budd Company, Philadelphia, Pa., a corporation of Pennsylvania Application March 9, 1944, Serial No. 525,708

6 Claims. (Cl. 153—3)

The invention relates to equipment for making curved profiles.

The outstanding object of the invention is to provide equipment for making profiles of sheet material. Such profiles are outstandingly of angle- or U-section. More specifically, the object of the invention is to make curved profiles of the indicated type in which the web is comparatively wide, so that it would offer great resistance to bending in its plane.

The making of angle- or channel-section members of the indicated type has proven to be extremely difficult. The accepted procedure consisted in stamping a blank between upper and lower dies in a press. The disadvantages of this procedure are the extremely high costs for the dies, even for comparatively simple forms, and the long delay caused by the making of the dies.

The objects of the invention are achieved and the disadvantages of the known procedure are overcome by forming a blank of sheet material of a width approximately equal to the combined widths of said web and flanges and having its edges curved to parallel the approximate curvature desired in the finished profile, by placing such blank on a mandrel having a surface or surfaces shaped to the contour of the flange or flanges and a surface adapted for supporting the adjoining web, by firmly holding the blank to the mandrel through its portion destined to constitute the web, and by then gradually turning the marginal portion or portions of the blank toward and against the curved surfaces of the mandrel so as to form the curved flange or flanges.

The step of bending the marginal portion or portions of the blank is preferably carried out in two, and under some conditions perhaps more, operations so that by the first operation the marginal portion or flange is bent only partly, say to a 60° position, whereas the following operation forces it against the curved surface or surfaces of the mandrel.

The bending of the marginal portion or portions of the blank is preferably carried out by passing the mandrel with the blank thereon between two rollers; the partial initial bending is carried out by one set of rollers with corresponding working surfaces, whereas the final bending is carried out by another set of rollers with a differently shaped working surface. The final bending may be followed by a further passage between the rollers so as to give the article or profile a final setting.

Another feature of the invention consists in providing a machine for the bending of the arms of the blank, the machine being provided with means for shifting automatically the axis of one or both rollers relative to the mandrel so as to obtain profiles having along their length flanges with changing angularity relative to the adjoining arm or web.

Further objects, advantages and the details of the invention will become apparent from the illustration of an embodiment in the attached drawing, and from the following description thereof:

The principle of the invention will be explained at first by reference to the diagrammatic Figures 1 to 10 and the details of the complete machine as illustrated in Figures 11 to 21 will be described thereafter.

Figures 1, 2:
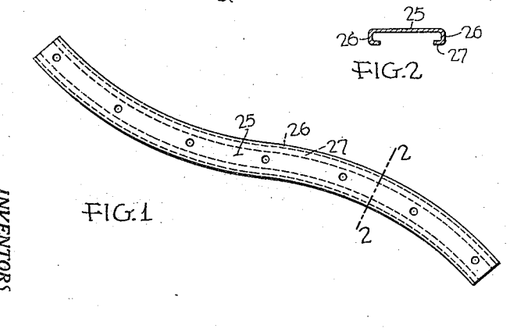
Figure 1 is a plan view of a finished curved profile.
Figure 2 is a section along line 2—2 of Figure 1.

Figures 1 and 2 show a typical workpiece which may be formed by the new method and equipment. This workpiece is in the form of a channel having a wide, generally plane, bottom wall or web 25 and side walls or arms 26 ending in inturned flanges 27. The side walls 26 are curved in the plane of the bottom wall 25.

Figure 3:
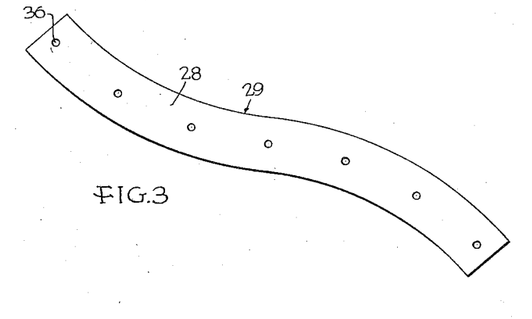
Figure 3 is a plan view of the blank adapted for making the profile illustrated in Figures 1 and 2.
Figures 8, 10:
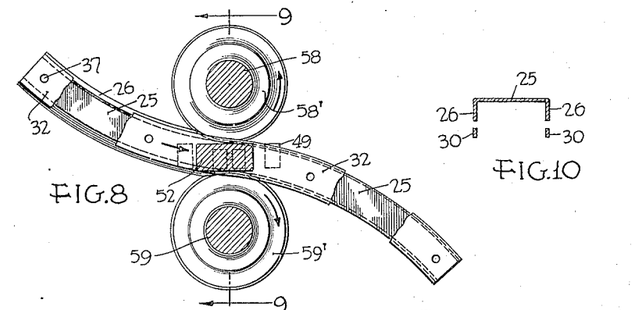
Figure 8 is a plan view similar to Figure 5 but illustrating the second forming operation to be executed on the central machine of Figure 4.
Figure 10 is a section through the workpiece after it leaves the central machine or the right-hand machine of Figure 4 and after the trimming operation but prior to the formation of the inturned marginal flanges as shown in Figure 2.

For making the profile illustrated in Figures 1 and 2, a blank 28 is cut out or otherwise formed which, as illustrated in Figure 3, has margins 29 paralleling substantially the contours of the finished workpiece and of a width equalling about the sum of the widths of the web 25, the walls 26, the flanges 27 and the strips 30 to be trimmed off (see Figure 10).

The blank illustrated in Figure 3 is placed between a mandrel 31 and a cover plate 32. The mandrel has in plan view the exact shape of the finished workpiece between its side walls 26 but its height is substantially greater than the side walls and the flanges 27. The lateral surfaces 33 of the mandrel have the curvature of the finished workpiece, and the top and bottom walls 34 are plane. The top plate 32 is slightly wider than the mandrel 31 and its lateral margins parallel the contours of the finished workpiece. Pins or dowels 35 inserted in holes of the mandrel extend through registering holes 36 and 37 of the blank 28 and the cover plate 32, respectively, so as to hold the members firmly in the predetermined relative positions. The pins or dowels 35 are removable and can be placed into the mandrel from opposite sides. Obviously, the same mandrel and cover plate can be used for making the symmetrical workpieces.

Figures 5, 6:
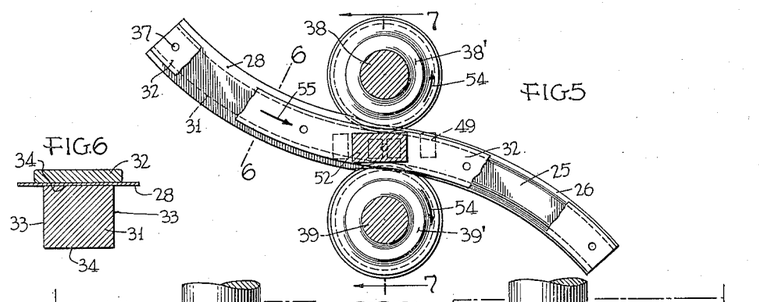
Figure 5 is a diagrammatic plan view, partly in section and certain parts being broken away, illustrating the first forming operation to be executed on the left-hand machine of Figure 4.
Figure 6 is a section along line 6—6 of Figure 5 through the blank and the mandrels between which it is held during the forming operations.

Shafts 38 and 39, rotatably supported in the machine 40 and power-driven, have secured to them rollers 38' and 39', respectively. The mandrel 31 and the cover plate 32 with the workpiece 28 between them are introduced between the two rollers 38' and 39'. The shaft 38 is supported in a sled 41 movable in gibs 42 and adjustable by means of a screw 43. The second shaft 39 is supported by a sled 44 and guided in the machine frame by gibs 44'. A hydraulic cylinder 45 by means of its piston (not shown) and piston rod 46 is adapted to exert pressure on the roller 39' and move it toward the roller 38'.

Figure 7:
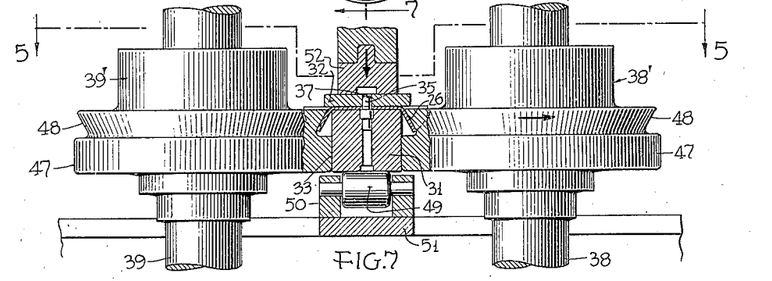
Figure 7 is a section along line 7—7 of Figure 5 on a larger scale.

Both rollers are substantially identical and have a lower, cylindrical, circumferential surface portion 47 and a recessed upper section with a 60°-inclined surface portion 48. The cylindrical portions 47 are adapted for engagement with the lower part of the mandrel 31, whereas the surface portions 48 serve for turning the projecting marginal portions of the blank 28 down to a 60°-position as shown in Figures 5 and 7.

During the passage of the mandrel 31 with its cover plate 32 and the blank 28 between the rollers 38' and 39', the mandrel 31 is supported on horizontally arranged idle rollers 49 supported in bearings 50 of the machine top plate 51; the axes of the rollers 49 extend transversely to the axes of the shafts 38, 39. The top plate 32 is pressed downwardly against the blank 28 by means of a guiding shoe 52 operated on by a hydraulic cylinder which will be described in connection with the details of the machine illustrated in Figures 11 to 21.

After the mandrel 31 with the blank 28 and the cover plate 32 has been introduced between the rollers 38' and 39', which rotate in the direction of the arrows 54, they are taken along in the direction of the arrow 55. The blank leaves the machine 40 with its marginal portions turned down to about a 60°-position, as shown in section in Figure 7.

After leaving the machine 40 the blank 28 and the mandrel 31 and the cover plate 32 are moved over the table 56 into the second machine 57. The second machine is substantially identical with the first machine in that it has sleds 41, 44, gibs 42, 44', an adjusting screw 43 and a hydraulic cylinder 45 with piston rod 46, horizontal rollers 49, a table 51, a hold-down shoe 52 and power-driven shafts 58, 59. The outstanding difference between the two machines consists in the form of the rollers 58' and 59'. These rollers have, as in the machine 40, a lower cylindrical portion 60 but an upper cylindrical portion 60' of slightly smaller diameter. The difference in diameter between the portions 60 and 60' is such that the recess formed is of a depth slightly smaller than the thickness of the side walls 26 of the workpiece.

Figure 9:
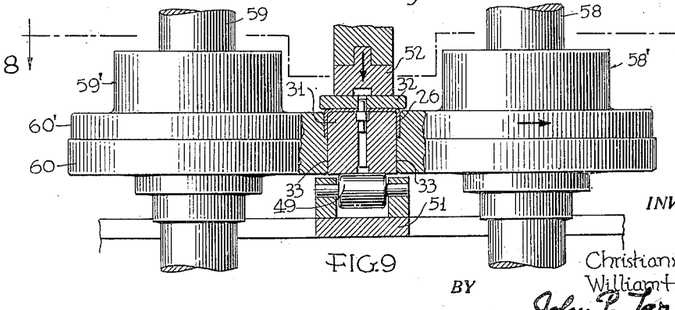
Figure 9 is a sectional view similar to Figure 7 taken along line 9—9 of Figure 8.
Figure 11:
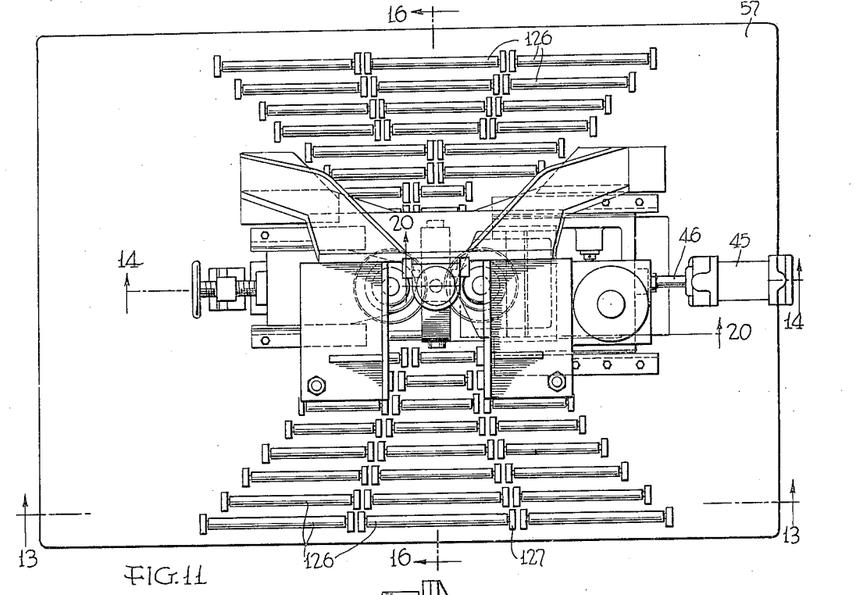
Figure 11 is a plan view of the central machine shown in Figure 4 but on a larger scale and showing more details.
Figure 12:
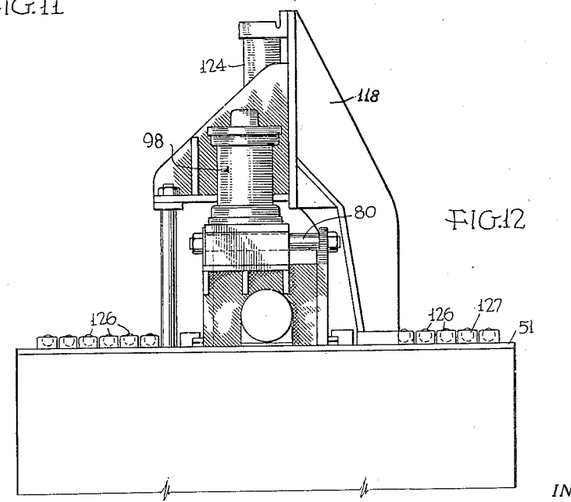
Figure 12 is an end elevation of the machine seen from the right-hand side of Figure 11.

When the mandrel 31 with cover plate 32 and workpiece 28 is introduced between the rollers 58' and 59', the cylindrical portions 60 engage the lower portion of the mandrel 31 and take it along while the upper portions 60' of the rollers turn the side walls 26 from the 60°-position completely down against the upper portion of the sides of the mandrel. Owing to the aforesaid difference in dimensions of the portions 60 and 60', a severe pressure is exerted on the side walls 26 of the workpiece. The pressure should be such that it compresses the arms 26 yet that driving contact is actually made between the cylindrical portions 60 of the rollers 58', 59' and the lower portion of the mandrel. The depth of the recess may be in the order of 0.002" less than the gauge of the workpiece; this difference was found suitable for stainless steel and will have to be adjusted to the nature of the material and the gauge of the blank.

Figure 4:
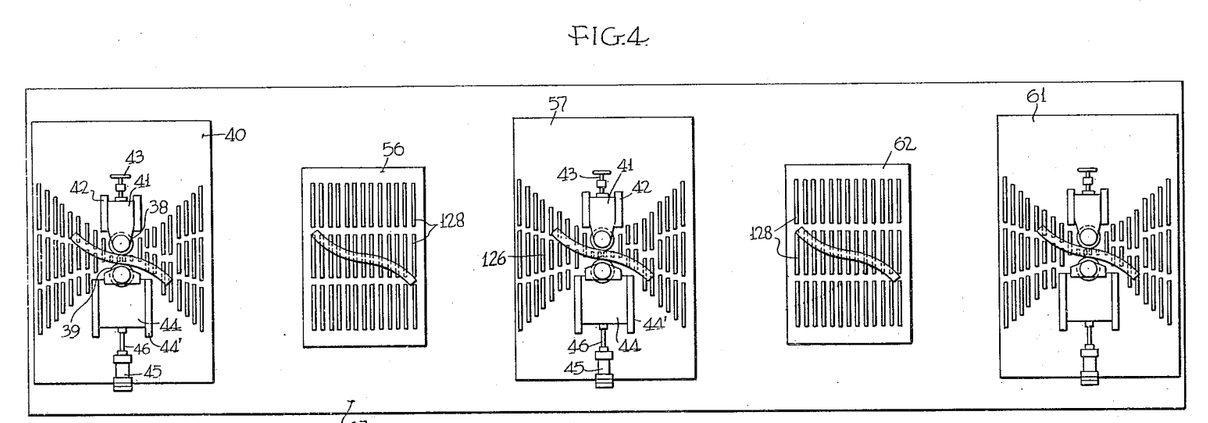
Figure 4 is a plan view of a machine installation for forming in a continuous succession of operations the article illustrated in Figures 1 and 2 from the blank shown in Figure 3.

In the case of comparatively heavy gauge material it has been found advisable to pass the blank with the mandrel through a third machine 61 over an intervening table 62. The third machine may be identical as to construction and form of the rollers with the central machine 57. This gives a final setting to the flange. Of course, the same object could be achieved also by passing the workpiece with the mandrels a second time or back and forth through the machine 57; however, such procedure would interfere with continuous production.

After the forming of the workpiece is finished on the machines 40, 57 and 61, it is removed from between the mandrel 31 and cover plate 32, and the margins 30 of the side walls 26 are trimmed off by any appropriate means, as illustrated in Figure 10. Thereafter the flanges 27 are turned inwardly to the position shown in Figure 2, by means (not shown) which do not constitute a part of this invention.

The machine 57 illustrated in detail in Figures 11 to 21 comprises a top plate 51 supported by side walls or structures 65 and a base plate or structure 66 arranged below the floor 67.

Secured to the top of the plate 51 are the hereinbefore described gibs 42 which movably guide the sled 41. The sled 41 is in the form of a sturdy box structure with projecting top and bottom walls 68, 69 (see Fig. 13). These projecting walls are provided with bearings 70, 71 (see Fig. 14) for the shaft 58 carrying the roller 58'. The hereinbefore described adjustment screw 43 has its one end rotatably secured at 72 to the sled 41, extends through a screw threaded bracket 73 secured to the table top 51 and has its outer end provided with a hand wheel 74.

Figure 14:
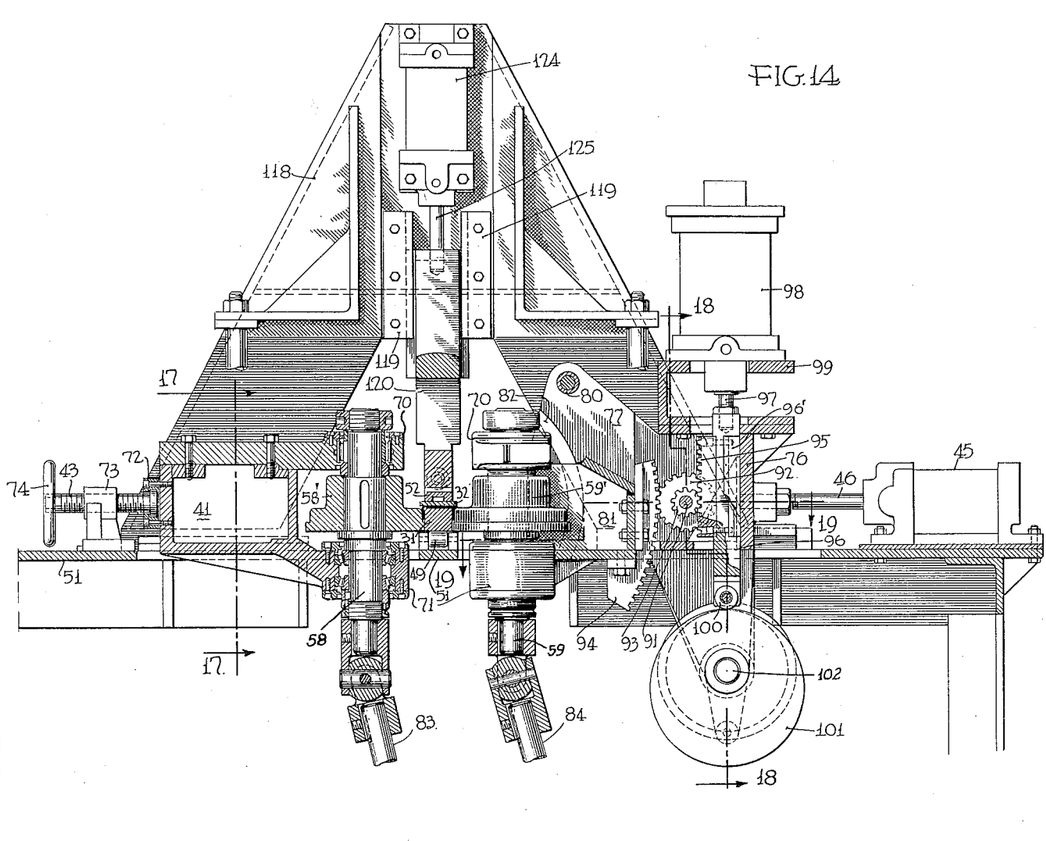
Figure 14 is a fragmentary section substantially along line 14—14 of Figure 11 on a larger scale.
Figure 15:
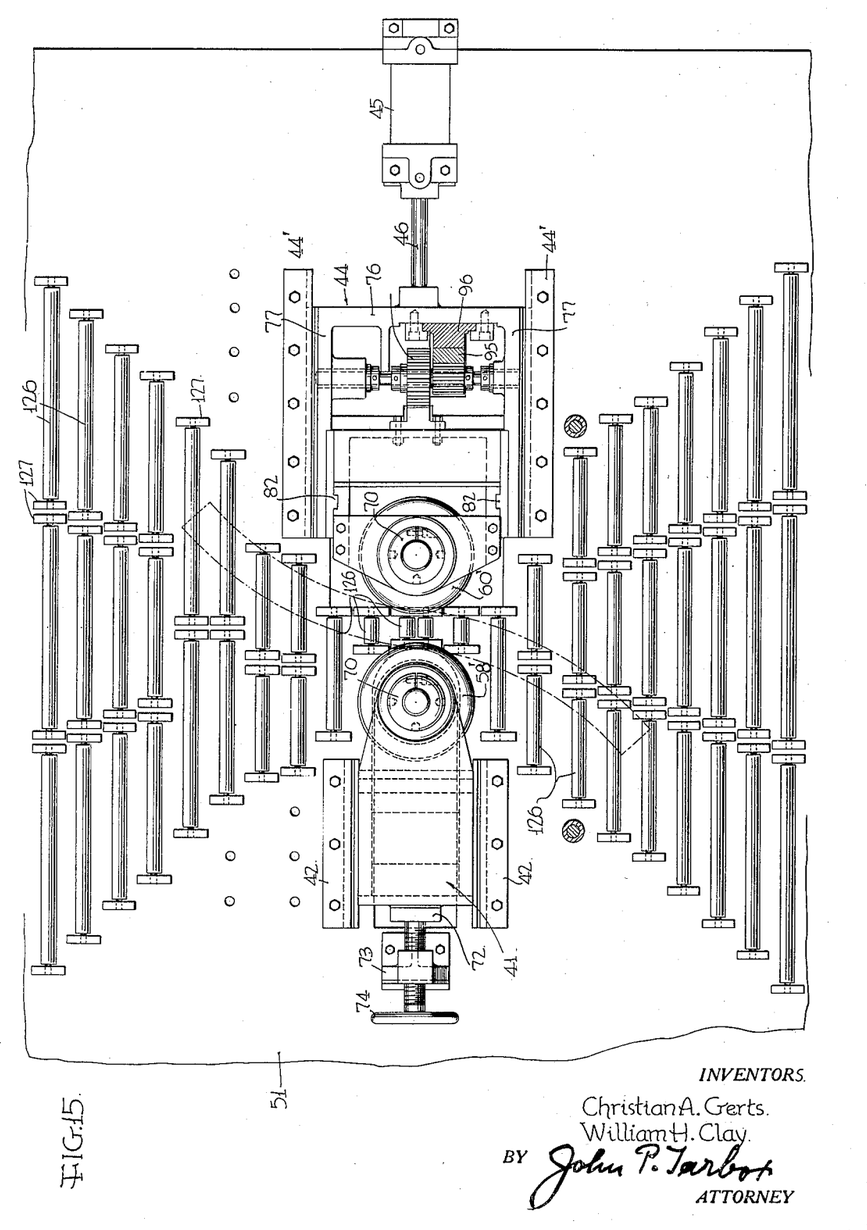
Figure 15 is a fragmentary plan view on the scale of Figure 14, part of the superstructure being removed to show the arrangement of the forming rollers and the mechanism for moving and adjusting them.
Figures 16, 17, 18:
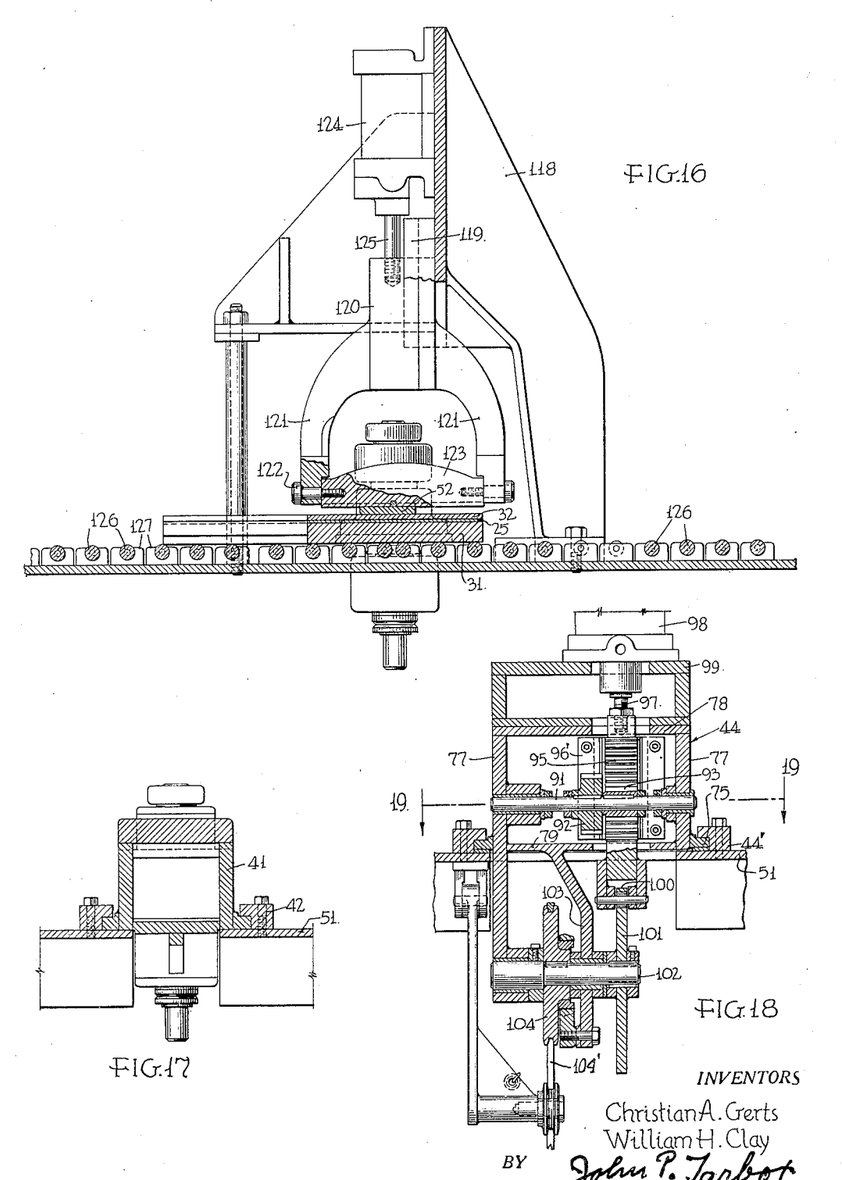
Figure 16 is a fragmentary section substantially along line 16—16 of Figure 11 on the same scale as Figures 14 and 15.
Figure 17 is a fragmentary section along lines 17—17 of Figure 14.
Figure 18 is a fragmentary section along line 18—18 of Figure 14.
Figure 19:
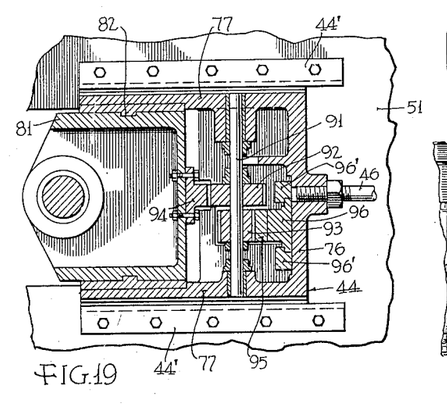
Figure 19 is a fragmentary section along lines 19—19 of Figures 14 and 18.

The gibs 44' are likewise secured to the table top 51 and are engaged by mating gibs 75 (Fig. 18) formed on the sled 44. This sled 44 has an end wall 76, side walls 77, a top wall 78 and a bottom wall 79 (Figures 14, 18, and 19). The inner ends of the side walls 77 are interconnected and kept at the proper distance by a spacer bolt and tube 80 (Fig. 14). The end wall 76 is connected to rod 46 of a piston movable in the interior of the hydraulic cylinder 45 secured to the table top 51. A structure 81 is guided by mating arcuate gibs or guideways 82 between the side walls 77 of the sled 44. This structure 81 is in the form of an open box and carries at its top and bottom a pair of bearings 70, 71 which are substantially identical with the hereinbefore described bearings having the same numerals, and support the shaft 59 for the second roller 59''.

The shafts 58 and 59 are driven by flexible and extensible shafts 83, 84. The shafts 83 and 84 are driven by members 85, 86 (see Figures 13 and 21) of a reduction gear 87, which is in turn driven by belts or chains 88 and another reduction gear 89 from an electric motor 90.

A shaft 91 (see Figures 14, 18, 19 and 20) is rotatably supported in bearings provided on the side walls 77 of the sled 44. Keyed to this shaft are two pinions 92 and 93. The pinion 92 meshes with an arcuate rack 94 secured to the structure 81, whereas the pinion 93 meshes with a straight rack 95 secured to a rod 96, which latter is slidably guided in gibs 95' secured to the end wall 76 of the sled 77. The rod 96 has its upper end secured to the rod 97 of a piston movable within the hydraulic cylinder 98. This cylinder is supported on top of the sled 44 by means of a bracket 99. The lower end of the rod 96 carries a cam follower 100 which is in engagement with a cam disc 101. The cam disc 101 is keyed to a shaft 102 which is rotatably supported in bearings provided in a downward extension of one of the side walls 77 and a bracket 103 extending downwardly from the bottom wall 79 of the sled 44. Keyed to the shaft 102 is also a V-belt disc 104 (see Figures 13 and 18).

The disc 104 is in driving connection by V-belt 104' with a disc 105 supported by its shaft 106 in a bracket 107 secured to the base plate 66 of the machine. The shaft 106 is coaxial with a second shaft 108 to which it can be coupled or from which it can be uncoupled by means of a clutch 109 operated by a lever 110. The shaft 108 is drivingly connected by a V-belt drive 111, a reducing gear 112 and another V-belt and chain drive 113 to the shaft 86 of the reducing gear 87. An idle pulley 114 (Fig. 13) supported by an arm 115, which is journalled at 116 to the underside of the top plate 51, is forced by a spring 117 against the belt 104' so as to keep the latter under tension irrespective of the position of the sled 44 carrying the disc 104; note the different positions indicated by full lines and dot-and-dash lines in Figure 13.

A bridge structure 118 (Fig. 14) is secured to the table top 51 over the region of the rollers 58', 59' and the structures supporting them. Slidably guided in vertical gibs 119 of the bridge structure 118 is a yoke 120 which extends with its arms 121 into the space between the rollers and carries swingably about a horizontal axis by means of pins 122 a supporting member 123 for the shoe 52 which serves for holding down the cover plate 32 of the mandrel. Supported by the bridge structure 118 is also a hydraulic cylinder 124. The rod 125 of the piston (not shown) in the cylinder 124 is connected to the upper end of the yoke 120.

In addition to the horizontal rollers 49 arranged between the forming rollers 58' and 59', a plurality of long rollers or pins 126 (see Figures 1 and 11 to 16) are rotatably supported in bearings 127 secured to the table top 51. Similar rollers 128 are provided on the tables 56 and 62 between the machines 40, 57 and 61. These rollers serve for guiding the mandrels easily and speedily through the machines in the exact required position and from one machine to the other.

The machine operates as follows. First the roller 58' is adjusted by means of the hand wheel 74 to the proper position depending upon the width of the mandrel 31; this width differs, of course, for different profiles of the workpiece. Then a shoe 52 of appropriate width is secured to the yoke 120. After these preparations, the workpiece, held between the mandrel 31 and the cover plate 32, is placed in the machine and the motor 90 is started. When, or shortly before, the end of the mandrel 31, 32 enters between the rollers 58', 59'', pressure medium is admitted to the cylinder 124 so as to exert pressure on the cover plate 32 by the shoe 52. Then pressure fluid is admitted to the cylinder 45 thereby forcing the roller 58' against the mandrel and the latter against the roller 59'. The rollers drivingly engage the mandrel 31 and take it along and simultaneously they bend the side walls 26 of the profile against the mandrel.

Figure 13:
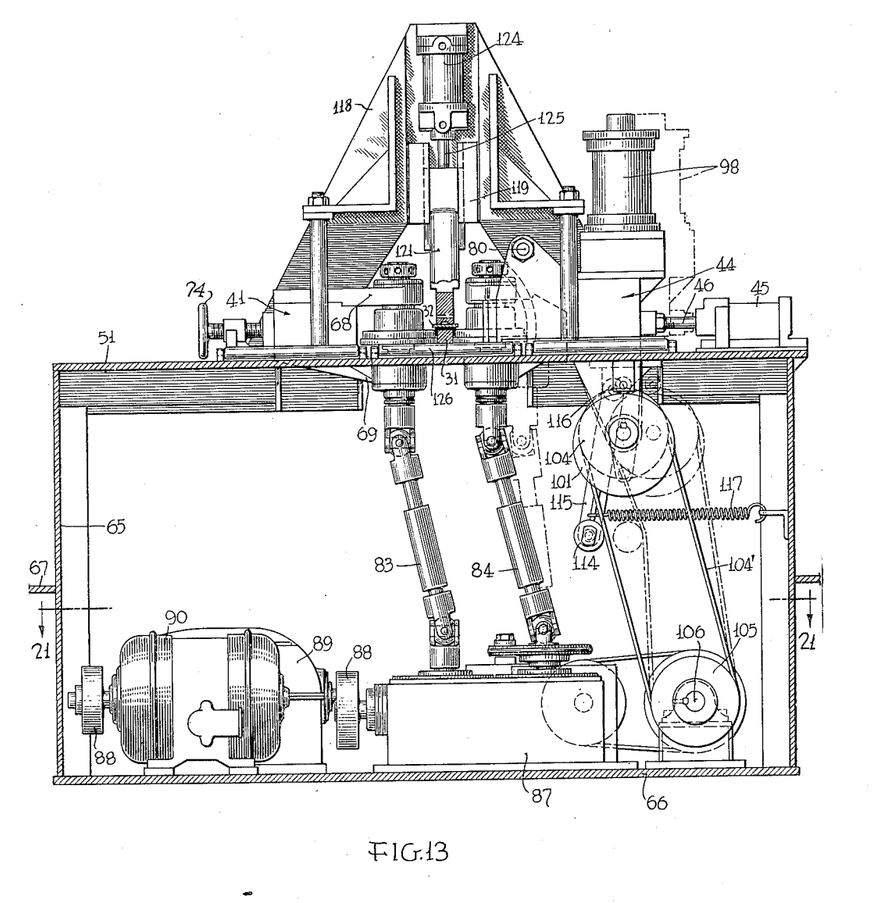
Figure 13 is an elevation partly in section along line 13—13 of Figure 11.

If the flanges 26 to be formed in the profile are to be uniformly in 90°-position as illustrated, for instance, in Figure 14, the clutch 109 is left uncoupled and the parts remain in the position illustrated, for instance, in Figures 13 and 14.

If, however, a profile is to be made which over a part of its length has a flange or arm 26' deviating from the 90°-position, then, in combination with a correspondingly shaped mandrel 31'' (see Fig. 20), the mechanism controlled by the coupling 109 is put in motion. Throwing in of the coupling 109 causes rotation of the cam disc 101 and forces the rod 96 with the rack 95 up and down against or following the pressure transmitted by the piston in cylinder 98 through the piston rod 97. This motion causes in turn the up and down swinging movement of the structure 81 about the center of the arcuate guides 82 on account of the pinions 93, 92 inserted between the racks 95 and 94. The center of the arcuate guide 82 preferably coincides substantially with the plane of the flange 26'.

Figure 20:
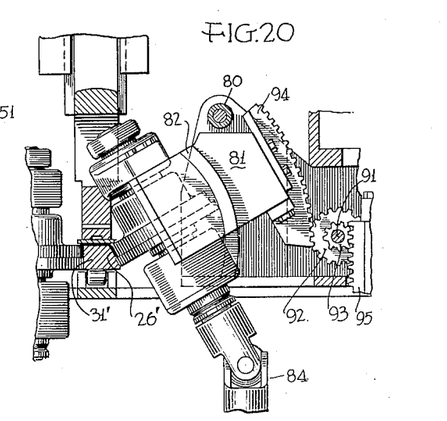
Figure 20 is a fragmentary section similar to part of Figure 14, but showing the adjustable roller and connected parts in a differently adjusted position and certain parts in elevation seen from about line 20 of Figure 11.
Figure 21:
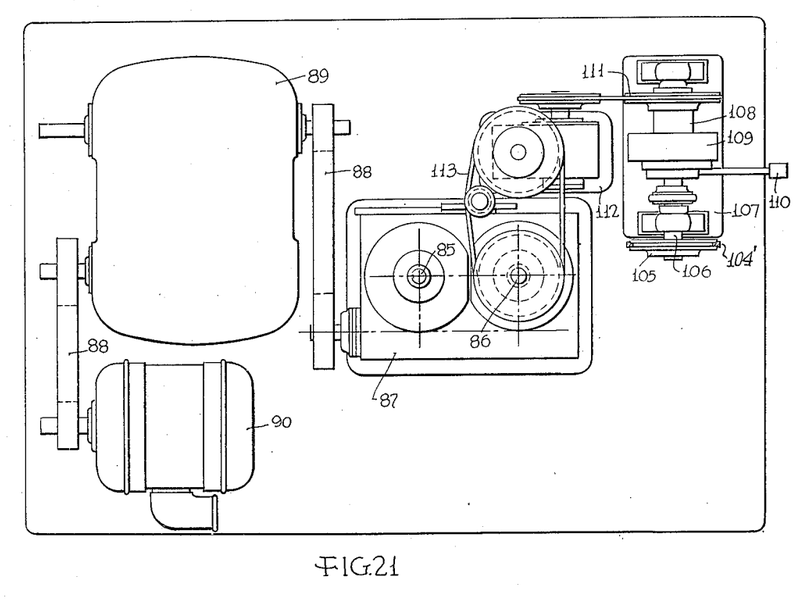
Figure 21 is a plan view of the driving mechanism of the machine seen substantially from the plane indicated by line 21—21 of Figure 13.

The swinging movement of the body 81 follows a law determined by the relative speed of the rollers 58', 59' and the form of the cam disc 101. This law can be changed by changing said relative speed and/or by using different forms of cam discs.

The means imparting swinging movement to the roller need only be provided on the machine or machines which turn the flange 26' completely against the mandrel 31', but such equipment is not necessary for the first machine 40 which turns the wall or flange 26 or 26' only partly down into the 60°-position or into any other intermediate position between the initial position and the final position of the side wall.

It will also be obvious that if both side walls of the workpiece have changing angularity, both rollers have to be supported for swinging movement in a manner illustrated in the embodiment for but one of the two rollers.

A reverse gear is included between the motor and the shafts or the direction of the motor itself is reversible so as to permit the movement of the work in either direction or back and forth through the machine.

With the exception of the lever 110 for the clutch 109, none of the control means, wire circuits, pressure medium conduits, pressure gauges, et cetera are illustrated or described. The machine is, of course, equipped with such means permitting the proper operation and control of its elements.

Neither the method nor the equipment for carrying it out is restricted to the illustrated and described embodiments but modifications and adaptations will easily occur to those skilled in the art and are intended to be covered by the claims.

What is claimed is:

1. A machine for turning a marginal portion of a curved blank of sheet metal toward a curved side surface of a mandrel supporting the blank to form a flange, said machine comprising means for supporting and guiding the mandrel for movement along a stationary structure, a pair of shafts spaced apart and supporting rolls having surface portions designed to grip the mandrel and drive it through said rolls during the turning operation, and means to drive said shafts, at least one of said rolls having a surface portion spaced from said gripping portion and conforming to the angularity of the desired flange and designed to contact an edge of the blank extending beyond the mandrel and turn it to form the desired flange, and means for exerting a resilient pressure on one of said rolls toward the other to insure the desired driving contact and accomplish said turning action.

2. A machine for turning a marginal portion of a curved blank of sheet metal toward a curved side surface of a mandrel supporting the blank to form a flange, said machine comprising means for supporting and guiding the mandrel for movement along a stationary structure, a pair of shafts spaced apart and supporting rolls having surface portions designed to grip the mandrel and drive it through said rolls during the turning operation, and means to drive said shafts, at least one of said rolls having a surface portion spaced from said gripping portion and conforming to the angularity of the desired flange and designed to contact an edge of the blank extending beyond the mandrel and turn it to form the desired flange, means for adjustably securing one of said rolls in operative position, and means for exerting a resilient pressure on the other of said rolls toward the adjustably secured roll to insure the desired driving contact and accomplish said turning action.

3. A machine for turning a marginal portion of a curved blank of sheet metal to form a flange, said machine comprising a mandrel having a surface designed to support the web of the blank, and a curved side surface toward which said flange is to be turned, said machine comprising means for supporting and guiding the mandrel for movement along a stationary structure, a pair of shafts spaced apart and supporting rolls having surface portions designed to grip the mandrel and drive it through said rolls during the turning operation, and means to drive said shafts, at least one of said rolls having a surface portion spaced from said gripping portion and conforming to the angularity of the desired flange and designed to contact an edge of the blank extending beyond the mandrel and turn it to form the desired flange, and means for exerting a resilient pressure on one of said rolls toward the other to insure the desired driving contact and accomplish said turning action.

4. A machine for turning the marginal portions of a curved blank of sheet metal toward curved side surfaces of a mandrel supporting the blank to form flanges, said machine comprising means for supporting and guiding the mandrel for movement along a stationary structure, a pair of shafts spaced apart and supporting rolls having surface portions designed to grip the mandrel and drive it through said rolls during the turning operation, and means to drive said shafts, each of said rolls having a surface portion spaced from said gripping portion and conforming to the angularity of one of said flanges and designed to contact an edge of the blank extending beyond the mandrel and turn it to form the desired flange, and means for exerting a resilient pressure on one of said rolls toward the other to insure the desired driving contact and accomplish said turning action.

5. A machine for turning a marginal portion of a curved blank of sheet metal toward a curved side surface of a mandrel supporting the blank to form a flange, said machine comprising means for supporting and guiding the mandrel for movement along a stationary structure, a pair of shafts spaced apart and supporting rolls having surface portions designed to grip the mandrel and drive it through said rolls during the turning operation, and means to drive said shafts, at least one of said rolls having a surface portion spaced from said gripping portion and conforming to the angularity of the desired flange and designed to contact an edge of the blank extending beyond the mandrel and turn it to form the desired flange, means for exerting a resilient pressure on one of said rolls toward the other to insure the desired driving contact and accomplish said turning action, and means for changing the relative angularity of said shafts to each other during driving of the mandrel between them, whereby the angularity of the flange being formed may be varied along the length of said flange by said turning operation.

6. A machine for turning a marginal portion of a curved blank of sheet metal toward a curved side surface of a mandrel supporting the blank to form a flange, said machine comprising means for supporting and guiding the mandrel for movement along a stationary structure, means for yieldably holding said mandrel supporting said blank against said stationary structure during said movement, a pair of shafts spaced apart and supporting rolls having surface portions designed to grip the mandrel and drive it through said rolls during the turning operation, and means to drive said shafts, at least one of said rolls having a surface portion spaced from said gripping portion and conforming to the angularity of the desired flange and designed to contact an edge of the blank extending beyond the mandrel and turn it to form the desired flange, and means for exerting a resilient pressure on one of said rolls toward the other to insure the desired driving contact and accomplish said turning action.

CHRISTIAN A. GERTS.
WILLIAM H. CLAY.

REFERENCES CITED

The following references are of record in the file of this patent:

UNITED STATES PATENTS

| Number | Name | Date |
|---|---|---|
| 214,181 | Nugent | Apr. 8, 1879 |
| 216,077 | Ball | June 3, 1879 |
| 221,438 | Bassett | Nov. 11, 1879 |
| 318,785 | Moore | May 26, 1885 |
| 731,769 | Gillen | June 23, 1903 |
| 817,246 | Heinle | Apr. 10, 1906 |
| 942,062 | Gabriel | Dec. 7, 1909 |
| 1,272,999 | Rehbein | July 16, 1918 |
| 1,420,427 | Hendrickson | June 20, 1922 |
| 1,426,253 | Bremer | Aug. 15, 1922 |
| 1,449,427 | McCabe | Mar. 27, 1923 |
| 1,503,884 | Curtis | Aug. 5, 1924 |
| 1,602,788 | Thomes | Oct. 12, 1926 |
| 1,673,787 | Frahm et al. | June 12, 1928 |
| 2,025,360 | Simmons | Dec. 24, 1935 |
| 2,219,207 | Goldthwaite | Oct. 22, 1940 |
| 2,308,432 | Johnson | Jan. 12, 1943 |
| 2,308,998 | Misfeldt | Jan. 19, 1943 |
| 2,339,032 | Schlenzig | Jan. 11, 1944 |
| 2,348,193 | Combs | May 9, 1944 |
| 2,357,793 | Clark | Sept. 12, 1944 |
| 2,397,608 | Johnson | Apr. 2, 1946 |

FOREIGN PATENTS

| Number | Country | Date |
|---|---|---|
| 536,935 | Great Britain | May 30, 1941 |
| 543,131 | Great Britain | Feb. 11, 1942 |
| 641,744 | Germany | Feb. 12, 1937 |
| 216,009 | Switzerland | Dec. 1, 1941 |